United States Patent
Elkow

[15] 3,680,848
[45] Aug. 1, 1972

[54] INTERNAL IDLER DRUM
[72] Inventor: Steven A. Elkow, Lagrange Park, Ill.
[73] Assignee: Sola Basic Industries, Inc., Milwaukee, Wis.
[22] Filed: Feb. 18, 1971
[21] Appl. No.: 116,305

[52] U.S. Cl. ................................... 263/6 C, 263/8
[51] Int. Cl. ................................... F27b 9/30
[58] Field of Search ........................... 263/6 C, 8 R

[56] References Cited

UNITED STATES PATENTS 1,965,350  7/1934  Moorshead et al. .......... 263/8 R
3,016,235  1/1962  Cnudde ....................... 263/8 R
3,103,346  9/1963  Buckholdt et al. ........... 263/6 C Primary Examiner—John J. Camby
Attorney—Smythe & Moore

[57] ABSTRACT

An idler drum has concentric inner and outer tubular members connected at their ends by annular side plates. An inner tubular member is rotatably mounted upon a hollow shaft having its ends welded within openings in fixed mounting plates of the muffle. A lubricaTion pipe is attached to the inner wall of the hollow shaft and has openings therein connected to openings in the peripheral wall of the shaft through which a lubricant is introduced into the clearance between the hollow shaft and the inner tubular member. Layers of graphite tape may be wrapped around the hollow shaft prior to assembly to retain the lubricant.

7 Claims, 4 Drawing Figures

PATENTED AUG 1 1972 3,680,848

INVENTOR
STEVEN A. ELKOW
BY Smythe & Moore
ATTORNEYS

INVENTOR
STEVEN A. ELKOW

BY Smythe & Moore

ATTORNEYS

INTERNAL IDLER DRUM

A burn-off chamber or oven is generally provided with an endless conveyor belt moving therethrough upon which articles are conveyed as they are moved through the chamber. Such chambers may also be provided with a muffle with an atmosphere which is different from the atmosphere within the oven. It is therefore desirable to maintain these two atmospheres separate from each other so as to avoid any contamination of one by the other. Together with the main conveyor belt, there is generally provided a helper belt which is positioned under the main conveyor belt for a certain distance, generally within the muffle. This helper belt relieves the main conveyor belt of a considerable portion of the load and reduces the stress on the main belt so as to result in longer life of the main belt. Further, the weight and strength requirements of the main belt are reduced when used in conjunction with a helper belt.

Where one end of the helper belt is within the muffle, an idler drum must be provided to support the end of the idler belt. Since this idler drum is mounted within the muffle, it is necessary that the mounting be carried out in such a way that there is no leakage into the muffle. Further, since the idler drum must rotate in a high temperature, namely, of the order of about 1,500° F., provision must be made for accurately lubricating such a roller during operation thereof. Previously known arrangements for supporting an idler drum and shaft assembly within a muffle have not been generally satisfactory, since the structures involved were either too complicated or the drum did not operate effectively for relatively long periods of time without replacement.

One of the objects of the present invention is to provide an improved idler drum and shaft assembly for a helper belt in a burn-off muffle.

Another object of the present invention is to provide a shaft mount in a muffle wherein the shaft is sealingly attached to the muffle so as to prevent any leakage therefrom.

Another object of the present invention is to provide an idler drum of the nature as referred to above which can be effectively lubricated while operating at high temperatures.

According to one aspect of the present invention, an idler drum and shaft assembly for a helper belt in a burn-off muffle may comprise a hollow shaft having both ends sealingly attached, such as by welding, within openings in fixed vertical mounting plates which may be the side walls of a muffle. An inner tubular member is rotatably mounted on the hollow shaft, and an outer tubular member is mounted concentrically with respect to the inner tubular member by a pair of annular side plates attached to the corresponding ends of the inner and outer tubular members so as to define an idler drum. There is a clearance between the inner tubular member and the hollow shaft, and there is a plurality of openings in the periphery wall of the hollow shaft. Means are provided for connecting the shaft openings with a source of lubricant positioned outside of the mounting plates so that the lubricant can be introduced into the clearance between the inner tubular member and the hollow shaft. This means may comprise a pipe welded within the hollow shaft and having openings therein communicating with the shaft openings.

Other objects, advantages and features of the present invention will become apparent from the accompanying description and drawings, which are merely exemplary.

In the drawings.

Proceeding next to the drawings wherein like reference symbols indicate the same parts throughout the various views, a specific embodiment of the present invention will be described in detail.

Figure 1:
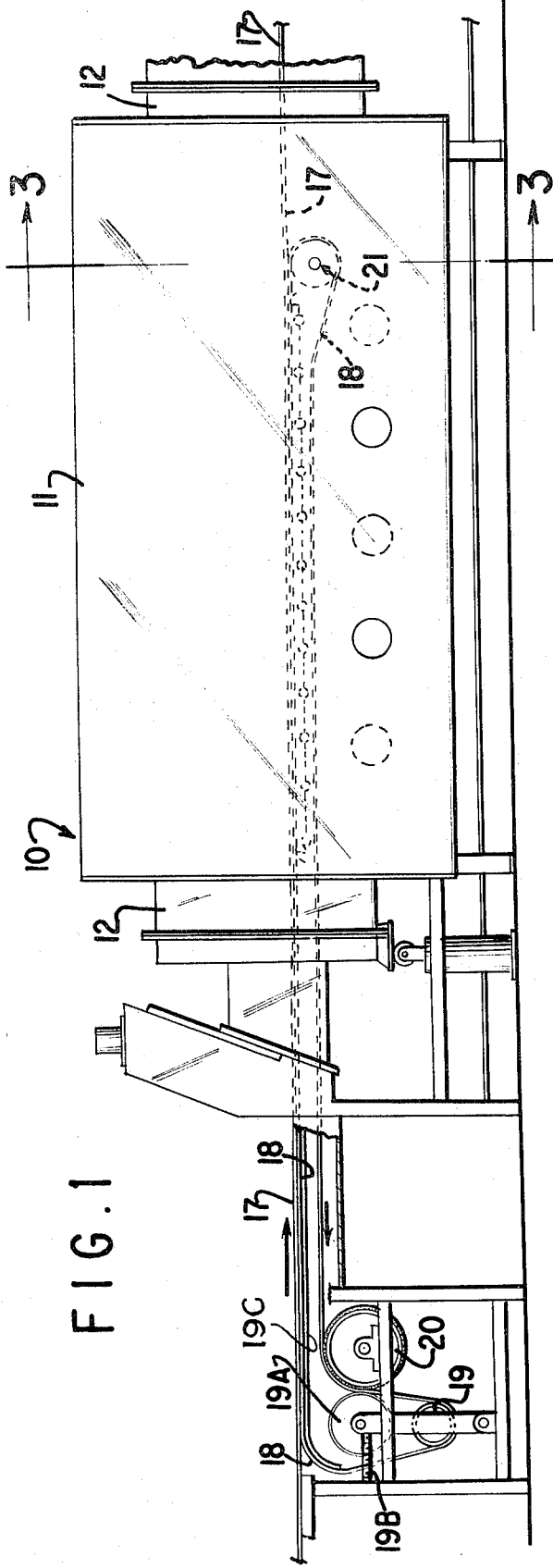
FIG. 1 is a side elevational view of a burn-off chamber having a muffle therein and incorporating an idler drum and shaft assembly according to the present invention.
Figure 2:
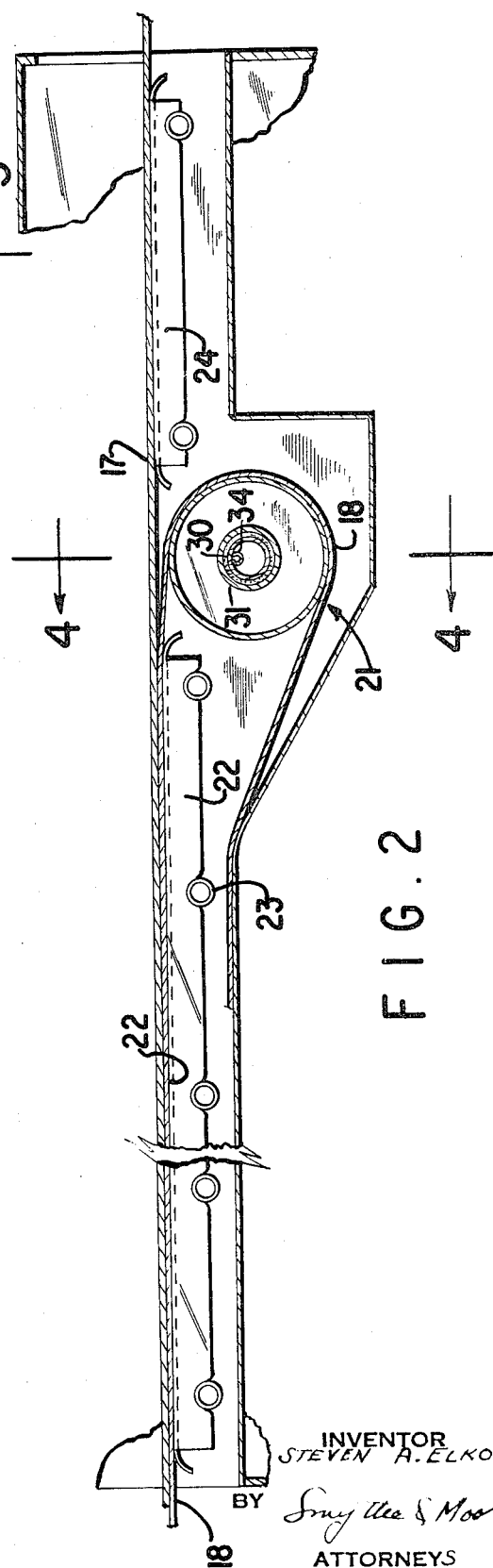
FIG. 2 is a longitudinal sectional view in enlarged scale of a portion of the muffle of FIG. 1 and illustrating the idler drum mounted therein.
Figure 3:
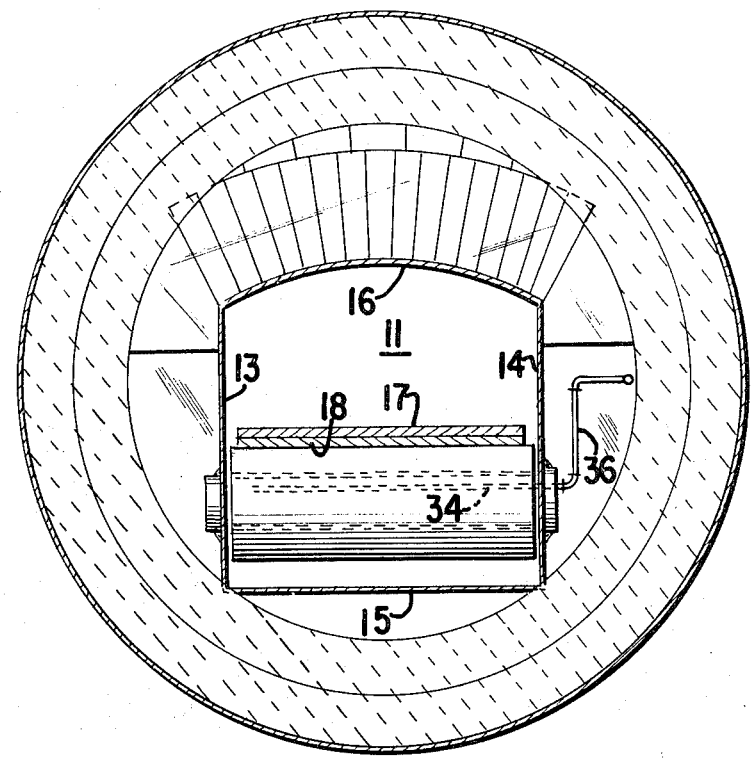
FIG. 3 is a sectional view taken along the line 3—3 of FIG. 1 and showing the idler drum in elevation.

There is illustrated in FIG. 1 the apparatus generally indicated at 10 which incorporates an internal idler drum and shaft assembly according to the present invention. The apparatus comprises a burn-off furnace or chamber 11 within which is mounted a muffle 12 having side walls 13 and 14, a bottom wall 15 and a top wall 16 as may be seen in FIG. 3, configuration of side walls 13 and 14 being shown in greater detail in FIG. 2.

Moving through furnace 11 is a main conveyor belt 17 which is of the mesh type as known in the art.

Positioned below a portion of the main belt 17 is a helper belt 18 which is also of a mesh construction. The upper reach of helper belt 18 is positioned immediately below the main belt 17 so as to support this portion of the main belt. The helper belt passes over driving drum 20 and is looped around counterweight drum 19, then over skid plate 19C and returns over an internal idler drum 21 constructed according to the present invention. Pressure roll 19A can be arranged to exert pressure on the helper belt against the drive drum 20. Pressure roll 19A and drive drum 20 can be covered with "neoprene" or similar material. Adjustment mechanism 19B can be used to adjust pressure between the rolls.

Positioned below the helper belt 18 and within the muffle are a plurality of skid rails 22 mounted on a plurality of pipes or supports 23 which extend transversely between the side walls of the muffle and can be welded thereto. A plurality of skid rails 24 are also positioned in that portion of the muffle following idler drum 21.

Figure 4:
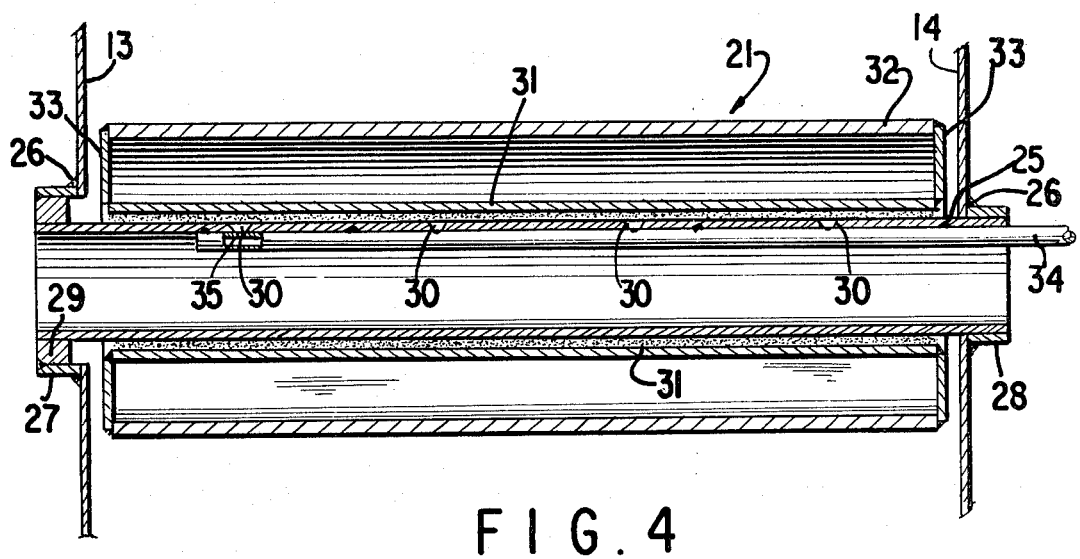
FIG. 4 is a sectional view taken along the line 4—4 of FIG. 2 and showing structural details of the idler drum and shaft assembly.

As may be seen in greater detail in FIG. 4, the idler drum 21 and shaft assembly comprises a hollow shaft or tube 25 whose ends are welded at 26 within tubular extensions 27 and 28 mounted within openings in the muffle side walls 13 and 14. Tubular extension 27 is of a somewhat greater diameter than extension 28 and has an annular member 29 therein within which is received the end of hollow shaft 25. The peripheral wall of shaft 25 is provided with a plurality of openings 30 which are aligned parallel to the rotational axis of the idler drum 21. The shaft 25 is preferably made of a heavy walled alloy.

Drum 21 comprises an inner tubular member 31 rotatably positioned around shaft 25 and an outer tubular member 32 with the ends of the tubular members being connected by means of side plates 33.

An alloy or suitable material pipe or conduct 34 is welded to the inner wall of shaft 25 and has a plurality of openings 35 therein which are aligned with shaft openings 30. Pipe 34 is connected through suitable piping 36 to a source of lubricant located outside of the muffle.

Prior to assembly of the idler drum of shaft 25, the outer diameter of shaft 25 and inner diameter of tubular member 31 are coated with a suitable lubricant, and the outer diameter of the shaft 25 is then wrapped with layers of graphite or similar tape. Shaft 25 is then inserted within tubular member 31 while carefully avoiding the removal of any lubricant or tape. After the drum has been positioned upon the shaft, the ends of shaft 25 are then edge-welded to the tubular extensions on the muffle side walls as described above.

The inner tubular member 31, which runs the full length of the drum, acts as a bearing upon the mounting shaft 25. The length and diameter of this bearing produces low bearing pressures which are desirable due to the belt pull and operating temperature of 1,500° F. The operating temperatures generally range from 800°- to 1,400° F. A clearance is provided between the mounting shaft 25 and inner tubular member 31 to accommodate lubricant therein. During operation, lubricant may be introduced to this clearnace through pipe 34 as required. The drum may be lubricated while in operation or during shut-down and thus provides lubrication which significantly decreases the friction factor in the rotation of the drum.

The use of the larger diameter tubular extension 27 in muffle side wall 13 enables shaft 25 to be passed therethrough during installation without scraping or removing any of the lubricant from the surface of the shaft.

The shaft may be readily removed from the muffle walls by simply grinding off the edge welds to loosen the shaft, and the shaft may then be readily removed and replaced.

It is apparent that with the illustrated construction, the gas fired unit or the products of combustion from the gas fired unit can flow through the shaft 25 but cannot enter in the muffle.

Thus, it can be seen that the present invention discloses an idler drum and shaft assembly for supporting a helper belt in conjunction with a high temperature mesh belt conveyor within a furnace. The construction of the drum and shaft assembly results in low bearing pressures which are desirable for the high operating temperatures encountered within the furnace. Further, gases may be introduced through the hollow shaft supporting the idler drum, but these gases can be maintained separately from the atmosphere within the muffle and thus eliminate any contamination of these atmospheres.

It will be understood that various details of construction and arrangement of parts may be made without departing from the spirit of the invention except as defined in the appended claims.

What is claimed is:

1. In an idler drum and shaft assembly for a helper belt in a burn-off type muffle, the combination comprising a hollow shaft having both ends thereof sealingly attached within openings in fixed vertical mounting plates, an inner tubular member rotatably mounted upon said hollow shaft and an outer tubular member concentric with said inner tubular member, annular side plates attached to the corresponding ends of the said inner and outer tubular members to define an idler drum, there being a plurality of openings in the wall of said hollow shaft, and means for connecting said openings with a source of lubricant positioned outside of said mounting plates whereby the lubricant can be introduced between said inner tubular member and said hollow shaft.

2. An idler drum and shaft assembly as claimed in claim 1 wherein said hollow shaft openings are aligned parallel to the rotary axis of the idler drum.

3. An idler drum and shaft assembly as claimed in claim 2 wherein said lubricant connecting means comprises a pipe extending outwardly of one end of said hollow shaft.

4. An idler drum and shaft assembly as claimed in claim 1 wherein there is a clearance between the inner tubular member and the hollow shaft.

5. An idler drum and shaft assembly as claimed in claim 4 and comprising lubricant retaining means in the clearance between said hollow shaft and inner tubular member.

6. An idler drum and shaft assembly as claimed in claim 5 wherein said lubricant retaining means comprises layers of graphite tape.

7. An idler drum and shaft assembly as claimed in claim 1 wherein the ends of said hollow shaft are welded to the mounting plates.

* * * * *